Sept. 3, 1946. E. W. SPRINGER 2,406,861
PLOTTER INDICATOR FOR HARBOR DEFENSE
Filed April 9, 1943 2 Sheets-Sheet 2
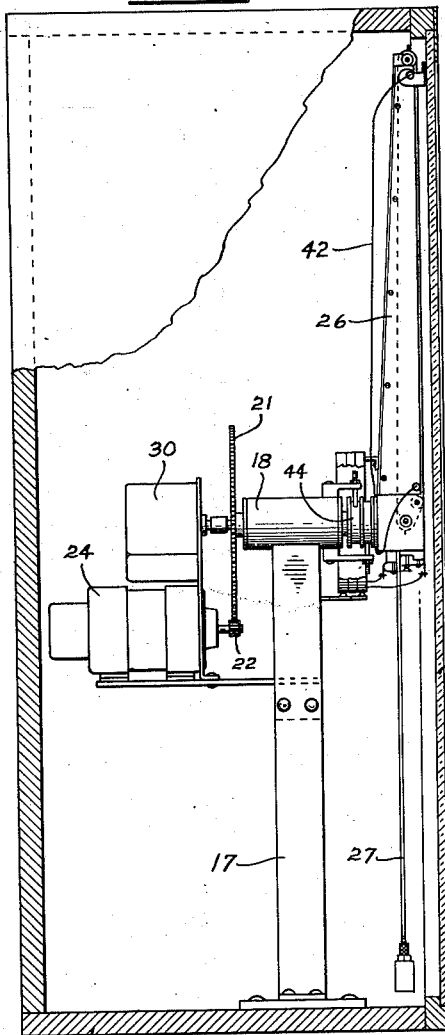
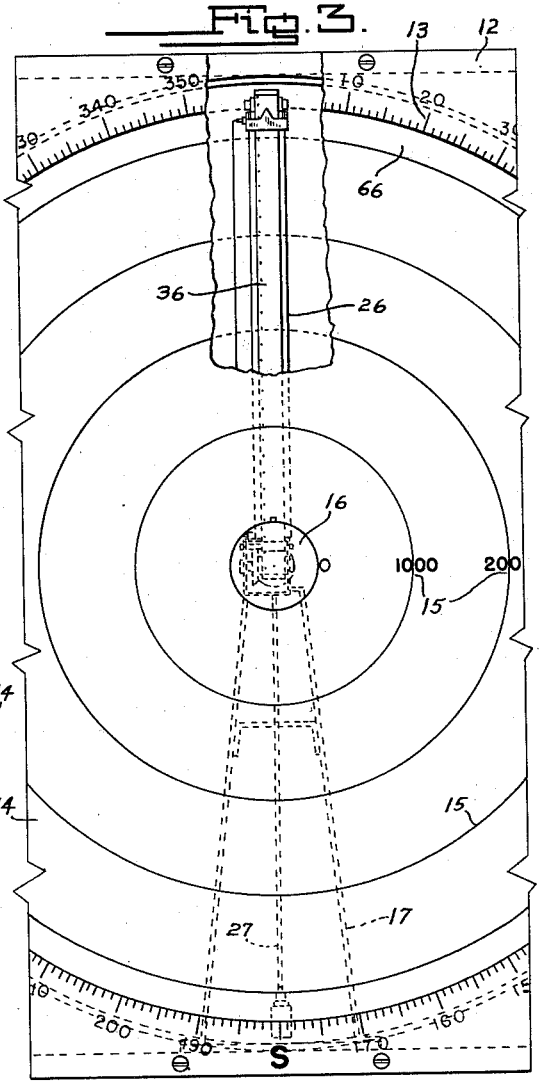
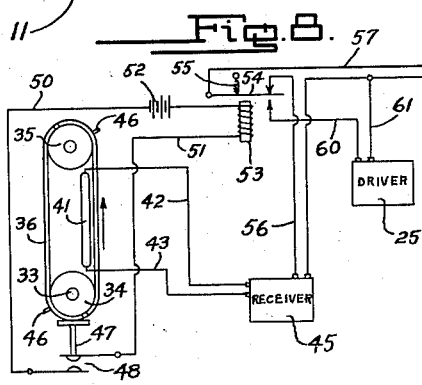
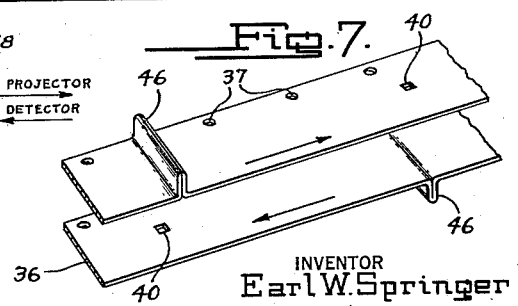
INVENTOR
Earl W. Springer
BY
ATTORNEY

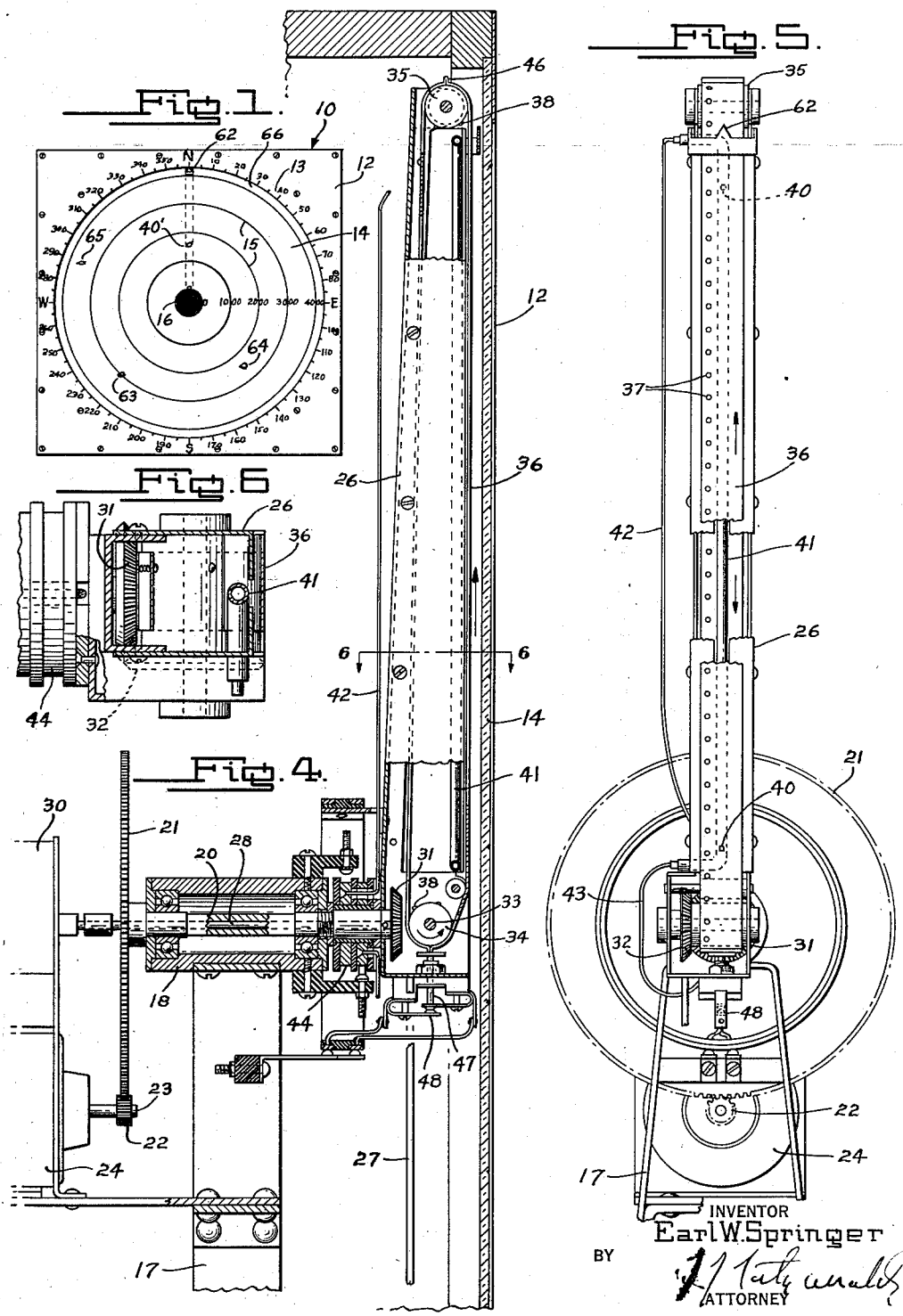

Patented Sept. 3, 1946

2,406,861

UNITED STATES PATENT OFFICE 2,406,861

PLOTTER INDICATOR FOR HARBOR DEFENSE

Earl W. Springer, Silver Hill, Md.

Application April 9, 1943, Serial No. 482,509

8 Claims. (Cl. 177—386)

(Granted under the act of March 3, 1883, as amended April 30, 1928; 370 O. G. 757)

This invention relates to a plotter indicator for harbor defense, and has for an object to provide a plotter indicator for use in connection with an offshore echo ranging system, particularly intended for use in watching limited areas such as harbors, river mouths, etc., to detect the presence of any unauthorized submarine or vessel attempting to enter the area under water or in fog or darkness.

A further object of this invention is to provide an indicator for detecting and indicating the range and azimuth of any object within such harbor area, as well as to enable any moving object in such area to be immediately detected and to have the range and azimuth of its movement plotted so that if the object be an unfriendly vessel or submarine it may immediately be attacked and destroyed or captured.

A further object of this invention is to provide a means for simultaneously indicating the range and azimuth of an unknown object on the same plotting indicator, which indicator may already have plotted thereon the range and azimuth of all known objects in the area, thus making it possible to realize immediately the presence of an unknown object in the area.

Still a further object of this invention is to provide a harbor echo range and azimuth listening device which utilizes a supersonic projector and detector placed at a suitable location in the area to be detected, and controlled by and connected to the plotter indicator, a control means being located at a suitable shore station nearby.

With the foregoing and other objects in view, the invention consists in the construction, combination and arrangement of parts hereinafter described and illustrated in the drawings, in which:

Fig. 1 is an elevational front plan view of the plotter indicator.

Fig. 2 is a side edge view of Fig. 1, partly in section and on a larger scale.

Fig. 3 is a fragmentary partly sectional view of the front of the plotter indicator, similar to Fig. 1, on the scale of Fig. 2.

Fig. 4 is a fragmentary view similar to Fig. 2, on a still larger scale, and partly in cross-section.

Fig. 5 is a front plan view of the belt partly broken away and its operating mechanism.

Fig. 6 is a sectional view on line 6—6 of Fig. 4.

Fig. 7 is a perspective view of a fragment of the belt, including the contacting operating bosses thereon; and Fig. 8 is a schematic outline and wiring assembly of the entire device.

There is shown at 10 the plotter indicator of this invention, which includes a box 11 for containing the shore station mechanism, at the front of which is a dial 12 provided with azimuth indications 13 thereabout. Located in an opening in dial 12 is a dial face 14 provided with range indicated circles 15 thereon commencing at the edge of a center spot 16 and extending radially thereof. As shown, the dial azimuth indications 13 are in degrees from 0 to 360°, the 0–360° point being marked N. for north with the other three cardinal points similarly indicated. The indication circles 15 are each marked off in ranges of 1,000 yards up to 4,000 yards at the outermost circle, although it will be understood that greater range areas could be indicated thereon if necessary. However, it has been found in practice that it is probably more desirable to use additional indicators for ranges beyond 4,000 yards.

The dial face 14 is made of frosted glass or other translucent material suitable for receiving a crayon or pencil marking thereon. Mounted on a bracket 17 within the box 11 behind the translucent dial face 14 is a bearing 18 through which extends a hollow shaft 20, fixed to one end of which is a large gear 21 meshed to a small gear 22 on the shaft 23 of a self-synchronous motor 24, this self-synchronous motor 24 being complementary to a similar motor in a projector-detector member 58. The other end of the shaft 20 has a supporting arm 26 mounted thereon and extending in one direction therefrom, while a counterweight arm 27 extends in the opposite direction so as to balance the weight carried by the shaft 20.

Extending through the center of the hollow shaft 20 is a shaft 28 from the motor 30 attached to beveled gear 31. This gear 31 is in mesh with a beveled gear 32 on a shaft 33 having a sprocket 34 so that the rotation of the motor 30 will cause the sprocket 34 to rotate at a corresponding speed. The shaft 33 of the sprocket 34 is mounted in bearings supported on the supporting arm 26. A corresponding sprocket 35 at the upper end of the supporting arm 26 serves with the sprocket 34 to carry a belt 36 thereon, this belt 36 having perforations 37 thereon to keep it properly aligned on the sprocket teeth 38 of the sprockets 34 and 35. This belt 36 is an endless belt and is provided with two windows 40 thereon, the windows 40 being spaced an equal distance apart from each other on the belt.

Also mounted on the supporting arm 26 is a neon flash tube 41 so mounted that it is closely adjacent the portion of the belt 36 that comes closest to the back of the translucent dial face 14. The neon flash tube 41 is provided with electrical leads 42 and 43 extending through a ring and brush arrangement 44 to the receiver 45. The belt 36 carries a pair of equally spaced apart switch-operating bosses 46 to mechanically contact the push button 47 of a switch 48 for completing a circuit through leads 50 and 51 through a battery 52 to an electromagnet 53. This electromagnet 53 serves to operate a switch member 54 against the tension of a spring 55. This switch member 54 is normally retained by means of spring 55 in a circuit from the receiver 45 through leads 56 and 57 to the projector-detector member 58. However, when the electromagnet 53 is actuated, it immediately disconnects the receiver 45 and instead connects the driver 25 through leads 60 and 61.

In operation, the projector-detector member 58 is located approximately at the center of the harbor or other area being guarded. This projector-detector member 58 is so mounted under water in the harbor that it can be rotated by a self-synchronous motor therein complementary to the self-synchronous motor 24. The motor 24 is provided with suitable controls (not shown) so that the supporting arm 26 may be directed at will behind the translucent dial face 14, a pointer 62 fixed on arm 26 and visible through a transparent annular ring 66 adjacent the dial face 14 showing the position of the supporting arm 26 at all times. The projector-detector member 58 is so arranged that when the pointer 62 is at the point marked N., or north, on the dial 12, the projector-detector member 58 will likewise be pointed North in the harbor, and rotation of the pointer 62 to any other azimuth will cause the projector-detector member 58 to be correspondingly pointed. However, it has been found in practice that it is more desirable to use additional offshore echo ranging systems with the associated indicators so spaced in the detector area as to permit the effective range of each equipment not to exceed 4,000 yards.

The belt 36 is rotated at such a speed that one window 40 will move from the zero position at the outside of the spot 16 on the dial to the 4,000 yard position at the outside of the dial face 14 in the same time that it takes for a sound sent out by the projector-detector member to make a round trip from the projector-detector member 58 to a point 4,000 yards away; that is, the window 40 will take five seconds to move this distance because the under water speed of sound is 4,800 feet per second.

A boss 46 will contact the push button 47 to operate the switch 48 just as adjacent window 40 is passing the edge of the spot 16. This will cause the switch 54 to connect the driver 25 and cause a supersonic impulse to be projected by the projector-detector member 58. If this sound hits the under-water object it will echo back and be received by the detector portion of the projector-detector member 58.

Assuming for a moment that the object that re-echoed the sound was 1,600 yards from the projector, then the echo would reach the detector portion exactly two seconds after it was sent out, and the window 40 will be under the spot 40' on the dial face 14. The sound reaching the detector portion will connect the detector portion through the lead 57, switch 54, and lead 56, to the receiver 45. Thus receiver 45, which includes an amplifier, will cause a circuit through the leads 42 and 43 to operate the flash neon tube 41 and light the same up momentarily. A spot of light will then be visible through the window 40 on the dial face 14 at the point 40' which, by interpolation between the range circles 1,000 and 2,000, will show that the object that caused the echo was at a range of 1,600 yards and an azimuth of north.

When the device is first set in a new area, the operator should carefully train the device over the whole area and range each echo-producing object in the area, plotting the same with a soft pencil or other marking means on the translucent dial face 14. If there is an echo-producing obstruction at an azimuth of, say 220° at a range of 3,000 yards, he will mark the same as indicated at 63. All other existing echo-producing objects should likewise be plotted, such as at 64 and 65, etc. Thereafter, in using the device, any spot of light produced at any of these known obstruction points can, of course, be ignored. However, should a spot of light appear anywhere on the dials that does not correspond to a known echo-producing obstruction, it will immediately indicate the presence of some unknown object at that point, such as a submarine under water or in the darkness or fog, a ship or vessel attempting to enter the harbor. Once such an unknown echo-producing obstruction is located, it may be kept under observation by controlling the self-synchronous motor 24 and its path may be traced by marking with a different colored pencil the locations of the subsequent flashes that appear. At the same time the operator will set in motion any defense actions necessary to investigate, capture or obstruct the unknown submarine or vessel attempting to enter the guarded area.

When no unknown echo is produced the operator will keep watching over the harbor by slowly training the projector in all different directions, say a few degrees apart every five seconds. It will thus be impossible for any submarine or other vessel to enter under cover of darkness or fog without its presence and course or location being immediately detectable and plottable on the dial face 14, enabling proper defensive measures to be immediately undertaken.

Other modifications and changes in the number and proportions of the parts may be made by those skilled in the art without departing from the nature of this invention within the scope of what is hereinafter claimed.

The invention described herein may be manufactured and used by or for the Government of the United States of America for governmental purposes without the payment of any royalties thereon or therefor.

What is claimed is:

1. A plotter indicator for a harbor or similar area comprising a sound projector and detector located in the area, a range and azimuth plotting face, range and azimuth indicating means movable over said plotting face, means for ranging said indicating means over said plotting face in correspondence with the underwater speed of sound means for simultaneously training said sound projector and detector and said indicator in identical azimuth, means actuated by said indicating means to cause the sound projector to project a sound, and means in said indicating means actuated by the echo of said projected sound on said detector to actuate said indicating means to indicate both range and azimuth on said plotting face simultaneously.

2. A plotter indicator for a harbor or similar area comprising a sound projector and detector located in the area, a range and azimuth plotting face, range and azimuth indicating means movable over said plotting face, means for ranging said indicating means over said plotting face in correspondence with the underwater speed of sound, means actuated by said indicating means to cause the sound projector to project a sound, means in said indicating means actuated by the echo of said projected sound on said detector to actuate said indicating means to indicate both range and azimuth on said plotting face simultaneously, and synchronous motor means for simultaneously training both said projector and detector and said indicating means in identical azimuth.

3. A plotter indicator for a harbor or similar area comprising a sound projector and echo detector located in the area, a range and azimuth plotting face located in a convenient position, range and azimuth indicating means movable over said plotting face, means for ranging said indicating means over said plotting face in correspondence with the underwater speed of sound means for simultaneously training said sound projector and detector and said indicator in identical azimuth, means actuated by said indicating means to cause the sound projector to project a sound, and means in said indicating means actuated by the echo of said projected sound on said detector to actuate said indicating means to indicate both range and azimuth on said plotting face simultaneously.

4. A plotter indicator for a harbor or similar area comprising a sound projector and detector located in the area, a range and azimuth plotting face, range and azimuth indicating means movable over said plotting face, means for ranging said indicating means over said plotting face in correspondence with the underwater speed of sound, means actuated by said indicating means to cause the sound projector to project a sound, means in said indicating means actuated by the echo of said projected sound on said detector to actuate said indicating means, and means for training said projector and detector and said indicating means in synchronism.

5. Means for locating an unknown object in a harbor or similar limited area comprising a sound projector and echo detector located in the area, a range and azimuth plotting means located in a convenient position, range and azimuth indicating means forming part of said plotting means, means connecting said sound projector and echo detector to said plotting means causing said sound projector to project a sound which, when echoed, causes said echo detector to actuate said range and azimuth indicating means of said plotting means, and means for synchronously training said range and azimuth indicating means over the plotting means and said sound projector and echo detector over the area.

6. Means for locating an unknown object in a harbor or similar limited area comprising a projector and echo detector located in the area, a range and azimuth plotting means located in a convenient position, range and azimuth indicating means forming part of said plotting means, means connecting said sound projector and echo detector to said plotting means causing said sound projector to project a sound which, when echoed, causes said echo detector to actuate said range and azimuth indicating means of said plotting means, means for synchronously training the azimuth part of said range and azimuth indicating means over the plotting means and said sound projector and echo detector over the area, and means for operating the range part of said range and azimuth indicating means in accordance with the underwater speed of sound.

7. A method for detecting the location or passage of an unknown object in a limited area comprising selectively projecting a sound over all the various portions of the limited area, plotting the range and azimuth of echoes produced by all known echo-producing objects within such area, continuing to selectively project sounds over the various portions of the area and plotting any echoes whose range and azimuth do not agree with the range and azimuth of the echoes already plotted from the known objects to thereby detect an unknown object.

8. A method for detecting the location or passage of an unknown object in a limited area comprising selectively projecting a sound over all the various portions of the limited area, plotting the range and azimuth of echoes produced by all known echo-producing objects within such area, continuing to selectively project sounds over the various portions of the area and plotting any echoes whose range and azimuth do not agree with the range and azimuth of the echoes already plotted from the known objects to thereby detect an unknown object and then continuing to selectively project sounds toward the unknown object and plotting any change in the range and azimuth of echoes produced by such unknown object to thereby reveal any change in the location of the unknown object.

EARL W. SPRINGER.